No. 880,589.　　　　　　　　　　　　　　PATENTED MAR. 3, 1908.
J. E. SNELLING.
MEAT TENDERER.
APPLICATION FILED SEPT. 26, 1907.
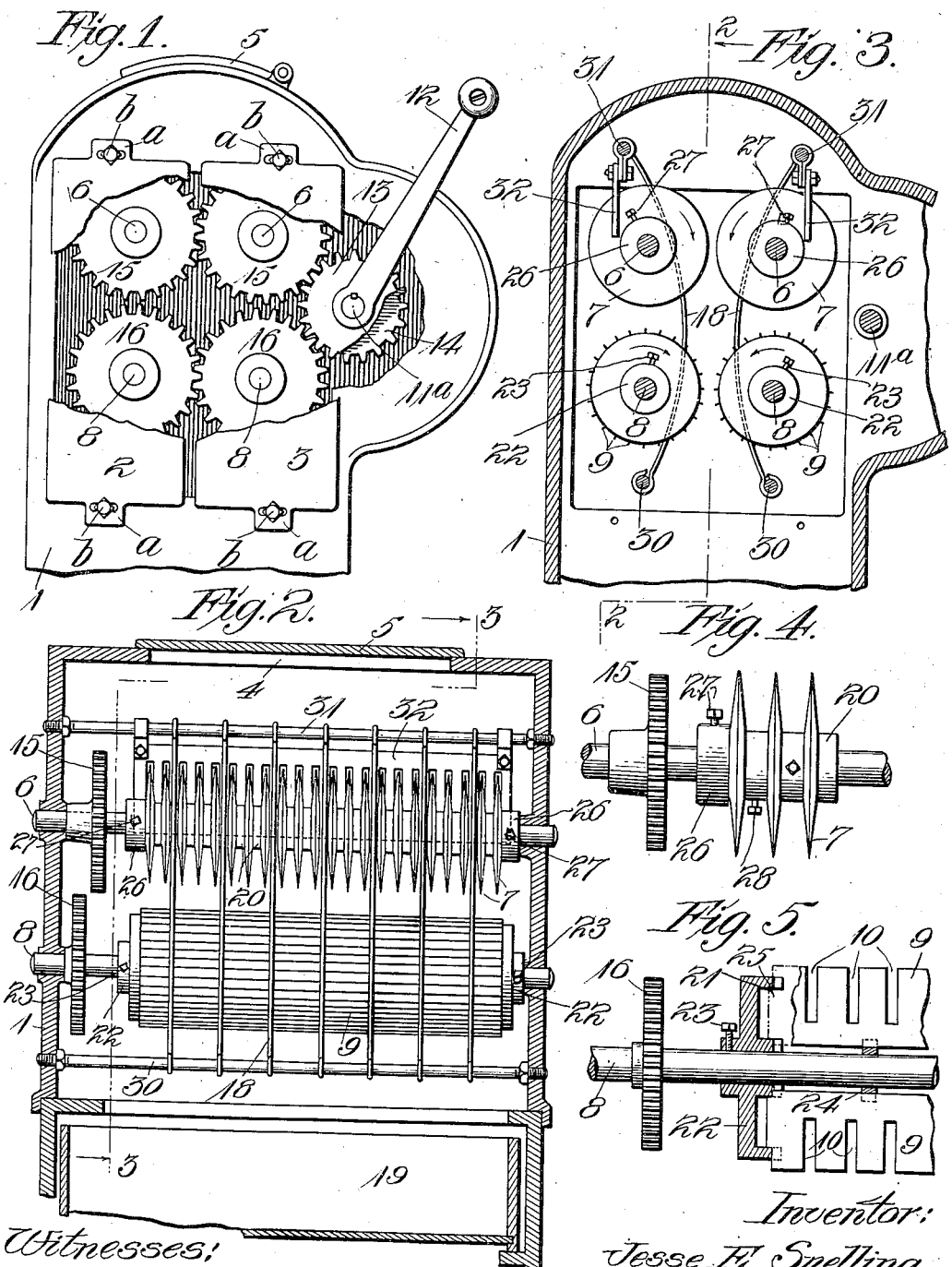
Witnesses:
Paul J. Gathmann
M. Lilian Adams
Inventor:
Jesse E. Snelling.
By his Attorneys:
Baldwin Wight

UNITED STATES PATENT OFFICE.

JESSE E. SNELLING, OF NEWARK, OHIO.

MEAT-TENDERER.

No. 880,589.

Specification of Letters Patent.

Patented March 3, 1908.

Application filed September 26, 1907. Serial No. 394,737.

*To all whom it may concern:*

Be it known that I, JESSE E. SNELLING, a citizen of the United States, residing in Newark, in the county of Licking and State of Ohio, have invented certain new and useful Improvements in Meat-Tenderers, of which the following is a specification.

In Letters Patent of the United States, No. 608,160, granted to me on July 26, 1898, I have shown a machine for cutting or hacking meat in such manner as to make it more tender without reducing it to fragments. In the machine shown in such patent, two gangs of circular or disk cutters are mounted on horizontal shafts and arranged in a vertical plane between which the meat is fed. Below the disk cutters are arranged two cylindrical gangs of cutters consisting of longitudinal blades mounted on horizontal shafts just below the shafts of the disk cutters and below the longitudinal cutters are arranged two gangs of rotary cleaning and guiding blades mounted on horizontal axes and geared to turn in directions opposite to the directions in which the longitudinal blades rotate and which are adapted to prevent the meat from being carried around by the blades and to clear these blades of any meat that may be adhering thereto. In this machine there is a hopper at the top into which the meat is fed and a drawer or receptacle at the bottom into which the meat drops after it has been acted on by the hacking devices.

The object of my present invention is to improve the machine of my former patent and to simplify it. I now dispense with the rotary cleaning and guiding blades and I employ vertically arranged rods or wires which extend from the top of the machine to the lower portion thereof between the disk cutters and through slots in the longitudinal blades. These rods or wires are so shaped that they form a hopper to receive the meat and they guide the meat as it passes down between the disk cutters and the longitudinal blades and they serve also to clean the disks and the longitudinal blades and render the use of the rotary cleaning blades of my former patent unnecessary. I also employ at the top of the machine vertically arranged combs which assist in cleaning the disk cutters.

In the accompanying drawings, Figure 1 shows an end elevation (with the casing broken away to show part of the gearing) of the upper part of a meat-tendering machine embodying my improvements. Fig. 2 shows a vertical, longitudinal, central section thereof, on the line 2—2 of Fig. 3, some of the gearing being shown in section while other interior parts are shown in elevation. Fig. 3 shows a vertical section on the line 3—3 of Fig. 2. Fig. 4 is an enlarged, detail view showing the manner of mounting the disk cutters on their shafts. Fig. 5 is a detail view showing the manner of mounting the longitudinal blades or cutters on their shafts.

The main casing 1 may be of any suitable construction to inclose the operative parts of the machine. A hopper is formed at the top of the machine which is provided with an opening 4 through which the meat is fed. The hopper has a hinged lid 5 that may be readily opened and closed. The casing is closed at front and rear. At opposite ends it is provided with removable or adjustable plates 2 and 3 which carry the bearings of the shafts 6 and 8 on which the disk cutters and longitudinal cutters are mounted. These plates are provided with slotted lugs *a* through which extend set screws *b* that enter sockets in the main casing. The plates may be adjusted toward and from each other horizontally to adjust the distance between the shafts of the gangs of cutters.

The gear wheels hereinafter referred to have long teeth which permit of the desired adjustment. The circular knives or disks 7 are mounted on the shaft 6 in such way as to hold them at proper distances apart, as shown in Figs. 2 and 4, and to prevent them from turning relatively to the shafts. The disks 7 on each shaft are separated and spaced apart by collars 20 which are clamped on the shaft by set screws 28, (see Fig. 4.) Collars 26 are attached to the shaft at opposite ends of each gang of disks and are firmly secured thereto by means of set screws 27. As shown in Fig. 2, there is a collar 26 near each end of each shaft 6, and the disks 7 and collars 20 are held firmly in place between these collars. The longitudinal blades 9 are secured to their shafts 8 in the manner indicated in Fig. 5. The blades 9 are arranged radially relatively to the axes of the shafts. At each end of each shaft 8, I secure a disk or collar 22, by means of a set screw 23. This collar has a flange 25 which is slotted to receive the ends of the blades and the blades are shouldered at 21 to prevent them from moving outward radially. The inner ends of the blades rest in sockets formed in the hubs of the collars.

24 indicates a radially slotted hub placed midway between the collars at the opposite ends of the knives. The inner ends of the blades extend through the slots in the collars 24. By this arrangement the blades are held at proper distances apart and are prevented from endwise movement or radial movement outward. The blades 9 are formed with transverse slots 10 as indicated, to receive the vertically arranged rods or wires 18. These rods or wires are arranged in the manner indicated. Their lower ends are attached to fixed, horizontal rods 30 below the shafts 8 and their upper ends are attached to rods 31 above the plane of the shafts 6. Any desired number of wires or rods 18 may be employed. Preferably a sufficient number is used to extend between each third disk 7 but obviously this number may be varied. Two sets of rods or wires 18 are used. One set extends between the disks and through the slots of the blades 9 on one side of the machine and the other set extends between the other set of disks and through the slots of the other blades 9 in the manner indicated in Fig. 3. The shafts 31 are somewhat wider apart than the shafts 6 and form a hopper to receive the meat fed in through the opening 4 and the wires as shown are curved in the manner indicated, being closer together between the shafts 6 and 8 than at either the top or bottom. I may also use vertically arranged combs 32, hung from the shafts 31 and with their teeth extending between the blades 7 to assist in cleaning these blades of meat that may adhere thereto. The circular cutters 7 are arranged to move in opposite directions, those portions above the shafts moving toward the center of the machine. Likewise the blades 9 move in opposite directions, those above the shafts 8 moving toward the center of the machine, the effect being to draw the material fed between the blades 7, inwardly and feed it downwardly.

The shafts 6 and 8 are geared together and a crank-handle 12 is rigidly secured to a horizontally arranged main driving-shaft 11$^a$ mounted in bearings in the frame. On the shaft 11$^a$, close to the crank but inside the frame, are secured pinions 13 and 14 which mesh respectively with pinions 15 and 16 on the adjacent shafts 6 and 8. The pinions 15 and 16 mesh with corresponding pinions on the shafts 6 and 8 on opposite sides of the machine. By this arrangement of gearing, the shafts are operated to revolve in the directions indicated by the arrows in Fig. 3. Provision is made for adjusting the shafts in horizontal planes toward and from each other, that is to say, one of the shafts 6 and one of the shafts 8 is adjustable toward the corresponding shafts on the opposite side of the machine to vary the space through which the meat passes vertically. This is accomplished, as heretofore explained, by means of the plates 2 and 3 provided with the slotted lugs $a$ through which the adjusting screws $b$ extend. A very wide adjustment is not required but the slots and the teeth of the gear wheels may be so formed as to give any desired adjustment. The shafts may be arranged a little closer together than shown in Fig. 3 so as to hold the edges of the opposite series of blades closer together than that shown in this figure but they should never be arranged so close together nor should they overlap to such an extent as to cut entirely through the meat fed into the machine. Care is taken that both the blades 7 and the blades 9 should cut only partway through the meat, forming as at were, merely grooves therein and leaving a thin web to hold all the parts of the meat together. The meat, when it leaves the machine, is formed with grooves arranged at right angles with each other, dividing the meat on both sides into small squares or checks and yet these squares or checks are held firmly together so as not to drop apart but the meat can be readily severed when desired. The meat, in this way, is made much tenderer, cooks better and is more eatable.

The machine may be reversed, that is to say, the meat may be fed upwardly instead of downwardly. Sometimes it may be desirable to feed only a portion of the steak through the cutters. It will be observed that the feed opening 4 is directly over the blades, so that the steak may be held in the hand of the operator and he may feed the lower portion of the steak between and through the cutters, then reverse the cutters and pull the steak upwardly out through the opening 4. Below the blades is a drawer 19 into which the tendered meat falls from the cutters.

I have found that by dispensing with the rotary cleaning blades 11 of my former patent and by using the wires 18, the cutting blades are kept much cleaner, there is less liability of pieces of meat being severed from the body thereof, there is less danger of the meat being wrapped around any of the cutters and it can be more easily guided while being operated upon by the machine.

I claim as my invention:

1. A meat-tendering machine comprising two gangs of circular cutters arranged to cut partway through the meat but not to sever it into strips, two cylindrical gangs of longitudinal blades having transverse slots and arranged below the circular cutters and also arranged to cut partway through the meat without severing it into strips, gearing for driving the circular blades and the longitudinal blades toward the center of the machine to feed the meat inwardly and downwardly between them and vertically arranged rods or wires extending through the slots of the longitudinal blades and between the disk cutters for guiding the meat and clearing the blades and cutters, substantially as set forth.

2. A meat-tendering machine comprising two gangs of circular cutters arranged to cut partway through the meat but not to sever it into strips, two cylindrical gangs of longitudinal blades having transverse slots arranged below the circular cutters and also arranged to cut partway through the meat without severing it into strips, gearing for driving the circular blades and longitudinal blades toward the center of the machine to feed the meat inwardly and downwardly between them, mechanism for driving the cutters and blades in the proper direction, adjustable plates at opposite ends of the machine carrying bearings for the shafts of the cutters and two sets of vertically arranged wires on opposite sides of the machine extending through the slots of the longitudinal blades and between the cutting disks, the upper ends of said wires being arranged further apart than their middle portions to form a hopper to receive the meat.

In testimony whereof, I have hereunto subscribed my name.

JESSE E. SNELLING.

Witnesses:
GEO. G. ADKINS,
NETTIE B. CRIPPS.